(12) United States Patent
Nelson et al.

(10) Patent No.: US 7,993,560 B2
(45) Date of Patent: Aug. 9, 2011

(54) PROCESS FOR INTRODUCING AN ADDITIVE INTO A POLYMER MELT

(75) Inventors: Kevin Philip Nelson, Appleton, WI (US); Dan G. Siegel, Belleville, IL (US)

(73) Assignee: Curwood, Inc., Oshkosh, WI (US)

( * ) Notice: Subject to any disclaimer, the term of this patent is extended or adjusted under 35 U.S.C. 154(b) by 1300 days.

(21) Appl. No.: 11/408,221

(22) Filed: Apr. 20, 2006

(65) Prior Publication Data

US 2007/0246867 A1    Oct. 25, 2007

(51) Int. Cl.
B29C 47/76 (2006.01)
B32B 37/00 (2006.01)
C09B 67/00 (2006.01)

(52) U.S. Cl. ........ 264/176.1; 264/211; 264/510; 428/35.9; 426/129

(58) Field of Classification Search ........ 264/510, 264/211, 176.1; 428/35.9; 426/129
See application file for complete search history.

(56) References Cited

U.S. PATENT DOCUMENTS

| | | | |
|---|---|---|---|
| 3,361,577 A * | 1/1968 | Simon et al. | 426/265 |
| 3,637,571 A * | 1/1972 | Polovina | 523/333 |
| 3,836,302 A * | 9/1974 | Kaukeinen | 425/197 |
| 5,317,052 A * | 5/1994 | Ohba et al. | 524/413 |
| 5,439,745 A * | 8/1995 | Ohba et al. | 428/412 |
| 5,759,329 A * | 6/1998 | Krause et al. | 156/244.13 |
| 5,972,447 A * | 10/1999 | Hata et al. | 428/35.7 |
| 6,149,850 A * | 11/2000 | Gannon | 264/211 |
| 6,176,176 B1 * | 1/2001 | Dale et al. | 99/470 |
| 6,287,508 B1 * | 9/2001 | Stripe | 264/570 |
| 6,527,991 B1 * | 3/2003 | Bakker et al. | 264/45.9 |
| 6,689,403 B1 * | 2/2004 | Gehring et al. | 426/56 |
| 7,037,543 B2 * | 5/2006 | Sandusky et al. | 426/129 |
| 7,658,881 B2 * | 2/2010 | Share et al. | 264/510 |
| 7,867,531 B2 * | 1/2011 | Pockat et al. | 426/129 |
| 2002/0052429 A1 * | 5/2002 | Weier et al. | 523/221 |
| 2002/0055006 A1 * | 5/2002 | Vogel et al. | 428/520 |
| 2004/0009273 A1 * | 1/2004 | Shaklai | 426/312 |
| 2005/0089607 A1 * | 4/2005 | Numata et al. | 426/264 |
| 2005/0129969 A1 * | 6/2005 | Schell et al. | 428/516 |
| 2005/0147778 A1 * | 7/2005 | Tai et al. | 428/36.91 |
| 2005/0279707 A1 | 12/2005 | Matthews et al. | |
| 2006/0216496 A2 * | 9/2006 | Gray et al. | 428/323 |
| 2006/0233985 A1 * | 10/2006 | Pockat et al. | 428/34.9 |
| 2006/0246242 A1 | 11/2006 | Siegel et al. | |
| 2006/0286323 A1 | 12/2006 | Siegel et al. | |
| 2007/0014947 A1 | 1/2007 | Mengel et al. | |
| 2007/0014953 A1 | 1/2007 | Siegel et al. | |
| 2007/0104901 A1 | 5/2007 | Siegel et al. | |
| 2007/0275134 A1 * | 11/2007 | Siegel et al. | 426/129 |

FOREIGN PATENT DOCUMENTS

| | | |
|---|---|---|
| EP | 0477634 A2 | 4/1992 |
| EP | 0478987 A2 | 4/1992 |
| EP | 0455370 B2 * | 8/2000 |
| WO | 2005097486 A1 | 10/2005 |

* cited by examiner

*Primary Examiner* — Joseph Del Sole
*Assistant Examiner* — Nahida Sultana
(74) *Attorney, Agent, or Firm* — Tom J. Hall

(57) ABSTRACT

A process includes introducing a base polymer into an extruder, heating to a temperature sufficient to form a polymer melt, introducing a liquid such as water including an additive with mixing and subsequent vaporization and venting of the liquid to produce an extrudate having a uniform distribution of preferably uniformly small additive particles.

6 Claims, 2 Drawing Sheets

PROCESS FOR INTRODUCING AN ADDITIVE INTO A POLYMER MELT

BACKGROUND

The present invention relates to a method of blending an additive into a base polymer. In particular, it relates to producing a homogeneous polymer blend with an additive, especially a salt additive useful for the manufacture of polymer films.

Melt blending polymers and functional additives to produce blended compounds is a common method to deliver those additives during the manufacture of plastic articles. The compound may be a concentrated combination (or masterbatch) of the additive and a carrier material whereby the final amount of the additive in the article is achieved by dilution during fabrication of the article. Additionally, the compound may be a fully formulated blend of additives and polymers that directly reflects the composition of the finished article. The quality and functionality of the article is often impacted by the uniformity of the dispersion of the additives in the compound. If the homogeneity of the dispersion is poor, it can be expected that the intended functionality of the additive will vary. Additionally, it is possible that undesirable side effects like poor aesthetics may result from poor dispersion of additives.

A pellet is a convenient form for providing compounded materials. The traditional way to form a compounded pellet is to combine the individual component materials in a high intensity mixing device. The polymeric portion of the combination is melted to form a viscous liquid or "melt". Various additives may be combined with the polymer before, during, or after melting. Those additives may be solids that may or may not undergo a solid to liquid (melting) phase change, solids that may or may not go through a solid to gas (sublimation) phase change, liquids that may or may not undergo a liquid to gas (vaporization) phase change, or gases. The high intensity mixing device is used to attempt to uniformly disperse the additive within the host polymer or carrier material. After additive dispersion is complete, the melt is discharged through a shaping device or "die" that is used to prepare the final shape of the compound. To form the convenient pellet shape, the die typically is outfitted with circular orifices through which the molten compound flows. The circular orifices form continuous cylinders of the compound that are subsequently cut to form pellets.

One type of additive is a colorant which may be a dye or solid pigment that may be compounded into a base polymer to form a masterbatch of colorant in a carrier polymer. It is known to produce such colorant masterbatches by addition of the colorant directly with the polymer, with or without premixing, into a Banbury mixer or a single or twin screw extruder hopper and thereby into an extruder which mixes the additive and carrier polymer together to form the masterbatch. Another known method is to disperse pigment into a liquid carrier such as mineral oil and admit the dispersion into the extruder hopper. Also, solid additives such as minerals e.g. calcium carbonate, silica and the like, and pigments, etc. as well as nonaqueous liquids such as tackifiers, antioxidants, slip agents and antifog agents may be introduced directly into a polymer melt to form an article or masterbatch pellets. It has also been suggested to introduce water alone into a polymer melt to act as a foaming agent.

The quality and functionality of dispersed additives depends upon certain characteristics of the additive and polymeric carrier as well as the mixing device. In the case of dispersing solid additive particles in a polymeric carrier, the distribution of sizes of the particles has a primary impact on the homogeneity of the resultant compound and fabricated articles that include that compound. The degree of homogeneity can, in turn, affect the functionality of the finished article. Additionally, it is desirable that the configuration of the mixing device and its conditions of use be appropriately selected such that the total surface area of the particles contacted by the carrier polymer is maximized. It is generally regarded that the presence of poorly wetted particle agglomerations is undesirable. Therefore, there is a need for a method of introducing additives into a polymer to provide a homogeneous blend.

BRIEF SUMMARY

In various aspects, a process is provided for introducing an additive, particularly an inorganic salt, into a polymer melt to form a blend. A film may be formed from the polymer blend and incorporated into a package for a food product.

In one aspect, the process includes introducing a polymer into an extruder. This polymer, which may be referred to as a base polymer or carrier polymer or resin, is heated to a temperature sufficient to form a polymer melt. Generally this temperature will be above a melting point of the base polymer, or above the glass transition temperature e.g. for amorphous polymers not having a melting point. A liquid, preferably water, including an additive is introduced into the extruder. The liquid is mixed with the polymer melt in the extruder to form a blend. At least a portion of the liquid vaporizes and vents from the extruder leaving at least a portion of the additive intimately admixed with the polymer. The additive containing polymer blend is extruded.

In another aspect, a method of producing a plastic film suitable for forming packaging, e.g. for meat, includes introducing a base polymer into an extruder. The base polymer is heated to a temperature sufficient to form a polymer melt e.g. above a melting point of the base polymer. A liquid including an additive is introduced into the polymer melt. The additive containing liquid is mixed with the polymer melt in the extruder to form a blend. At least a portion of the liquid vaporizes and vents from the extruder. The blend of additive and polymer is extruded and formed into a film or sheet. The film or sheet is incorporated into a package, wherein the film or sheet forms a layer e.g. an interior layer of the package. An article such as a meat product is disposed in the package.

DETAILED DESCRIPTION

Figure 1:
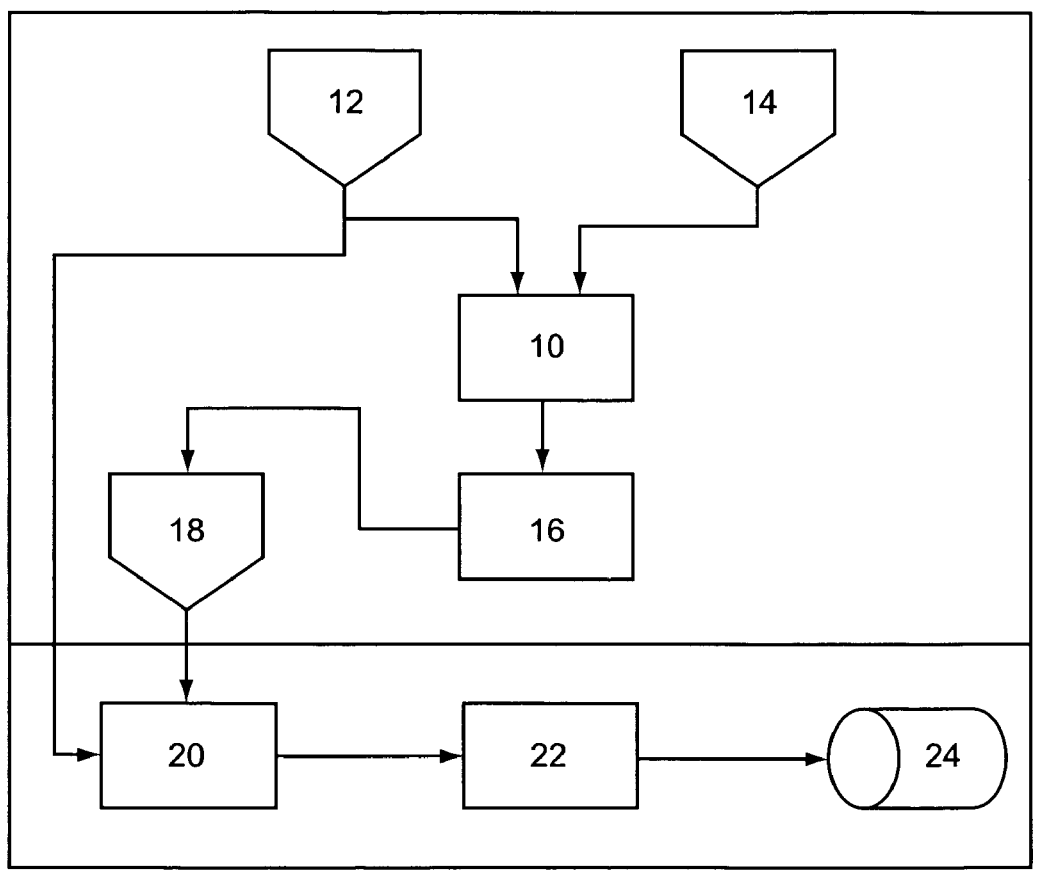
FIG. 1 is a schematic representation of one embodiment of a process for introducing an additive into a polymer melt.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

The invention is directed to a method of blending an additive to a polymer. In one aspect, it is directed to a method of introducing an additive containing liquid, preferably an aqueous solution, dispersion or emulsion, into a polymer melt. In another aspect, it is directed to a method of producing a homogeneous blend of a polymer including a salt.

In a preferred embodiment, the additive may be a myoglobin blooming agent. A "myoglobin blooming agent" refers to any agent (or precursor thereof) that binds to or interacts with any myoglobin-containing structure (including but not limited to deoxymyoglobin, oxymyoglobin, metmyoglobin, carboxymyoglobin, and nitric oxide myoglobin) present in a fresh meat product to produce or preserve a desired color, such as a red color indicative of fresh meat. The myoglobin blooming agent may also interact or cause an interaction with hemoglobin present in a meat product so as to produce, maintain or enhance i.e. "fix" a desired color. Thus, the myoglobin blooming agent is not a color additive, but it acts as a color fixative. In one preferred embodiment, the myoglobin blooming agent is a "nitric oxide donating compound" ("NO donor") that provides a nitric oxide (NO) molecule that binds to the myoglobin present in a meat product so as to maintain or promote a reddening or blooming or other favorable coloration of the meat product. A nitric oxide donating compound releases nitric oxide or is a precursor e.g. nitrate which acts as an intermediate leading to the formation of nitric oxide which binds to a myoglobin molecule in a meat product. An NO-donating compound comprises compounds capable of forming a nitrosyl group. In one aspect, the myoglobin blooming agent is a nitrate ($MNO_3$) or nitrite ($MNO_2$) salt, where suitable metal counter ion ($M^+$) can be selected from the group consisting of: alkali metals (e.g. sodium, potassium), alkaline earth metals (e.g. calcium), transition metals, ammonium and or protonated primary, secondary, or tertiary amines or quaternary amines. In another aspect, the myoglobin blooming agent comprises a Fremy's salt [$NO(SO_3Na)_2$ and $NO(SO_3K)_2$]. Other suitable nitric oxide donating agents are disclosed in U.S. Pat. No. 6,706,274 to Herrmann et al. (filed Jan. 18, 2001), U.S. Pat. No. 5,994,444 to Trescony et al. (filed Oct. 16, 1997), and U.S. Pat. No. 6,939,569 to Green et al. (filed Jun. 18, 1999), as well as published U.S. Patent Application No. US2005/0106380 by Gray et al. (filed Nov. 13, 2003). The myoglobin blooming agent may be a salt, particularly a nitrite or nitrate salt. Sodium nitrate or sodium nitrite or blends thereof may typically be used. Potassium nitrate or potassium nitrite may also be used. Additionally suitable compounds may include a nitrogen containing agent that promotes the release or formation of NO such as nitrite reductase, nitrate reductase or nitrosothiol reductase catalytic agents, including the materials described in WIPO Publication No. WO 02/056904 by Meyerhoff et al. (filed Jan. 16, 2002), which is incorporated herein by reference. It is expected that these agents and compounds would be suitable myoglobin blooming agents. Other suitable agents may include sulfur containing compounds that similarly bind or act as precursors or intermediates to agents that fix a desirable color by binding to myoglobin.

Myoglobin blooming agents and solutions or dispersions thereof may be colorless or may be slightly colored. For example, sodium nitrite may have an intrinsic pale color (i.e. may not be totally colorless), but this color does not typically have sufficient intensity itself to act as a significant colorant or color additive. However, this does not preclude either the use of colored myoglobin blooming agents which impart an intrinsic color or the combination of a myoglobin blooming agent in combination with one or more natural and/or artificial colorants, pigments, dyes and/or flavorants such as annatto, bixin, norbixin, beet powder, caramel, carmine, cochineal, turmeric, paprika, liquid smoke, one or more FD&C colorants, etc.

A polymer film may be made from the polymer comprising a salt or NO-donating compound. This polymer film is particularly useful in packaging for food products such as meat, where the NO donation compound is used to produce a bloom in the meat.

In referring to film structure, a slash "/" will be used to indicate that components to the left and right of the slash are in different layers and the relative position of components in layers may be so indicated by use of the slash to indicate film layer boundaries. Acronyms commonly employed herein include:

EAA—Copolymer of ethylene with acrylic acid
EAO—Copolymers of ethylene with at least one α-olefin
EBA—Copolymer of ethylene with butyl acrylate
EEA—Copolymer of ethylene with ethyl acrylate
EMA—Copolymer of ethylene with methyl acrylate
EMAA—Copolymer of ethylene with methacrylic acid
EVA—Copolymer of ethylene with vinyl acetate
EVOH—A saponified or hydrolyzed copolymer of ethylene and vinyl acetate
PE—Polyethylene (an ethylene homopolymer and/or copolymer of a major portion of ethylene with one or more α-olefins)
PP—Polypropylene homopolymer or copolymer
PET—Poly(ethylene terephthalate)
PVDC—Polyvinylidene chloride (also includes copolymers of vinylidene chloride, especially with vinyl chloride and/or methyl acrylate (MA)), also referred to as saran A "core layer," as used herein, refers to a layer positioned between and in contact with at least two other layers.

An "outer layer," as used herein, is a relative term and need not be a surface layer.

The term "exterior layer" refers to a layer comprising the outermost surface of a film or product.

The term "interior layer" refers to a layer comprising the innermost surface of a film or product. For example, an interior layer forms the interior surface of an enclosed package. The interior layer can be the food-contact layer and/or the sealant layer.

As used herein, the term "barrier," and the phrase "barrier layer," as applied to films and/or film layers, are used with reference to the ability of a film or film layer to serve as a barrier to one or more gases or moisture.

The term "adhesive layer," or "tie layer," refers to a layer or material placed on one or more layers to promote the adhesion of that layer to another surface. Preferably, adhesive layers are positioned between two layers of a multilayer film to maintain the two layers in position relative to each other and prevent undesirable delamination. In some embodiments, a peelable tie layer may be used which is designed to have either cohesive failure or delamination from one or both adjacent layers upon application of a suitable manual force to provide an opening feature for a package made from the film. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer film may comprise components of both the first layer and the second layer to promote simultaneous adhesion of the adhesive layer to both the first layer and the second layer to opposite sides of the adhesive layer.

As used herein, the phrases "seal layer," "sealing layer," "heat seal layer," and "sealant layer," refer to a film layer, or layers, involved in the sealing of the film: to itself; to another film layer of the same film or another film; and/or to another article which is not a film e.g. a tray. In general, the sealant layer is a surface layer i.e. an exterior or an interior layer of any suitable thickness, that provides for the sealing of the film to itself or another layer. With respect to packages having only fin-type seals, as opposed to lap-type seals, the phrase "sealant layer" generally refers to the interior surface film layer of a package. The inside layer frequently can also serve as a food contact layer in the packaging of foods.

"Polyolefin" is used herein broadly to include polymers such as polyethylene, ethylene-alpha olefin copolymers (EAO), polypropylene, polybutene, and ethylene copolymers having a majority amount by weight of ethylene polymerized with a lesser amount of a comonomer such as vinyl acetate, and other polymeric resins falling in the "olefin" family classification. Polyolefins may be made by a variety of processes well known in the art including batch and continuous processes using single, staged or sequential reactors, slurry, solution and fluidized bed processes and one or more catalysts including for example, heterogeneous and homogeneous systems and Ziegler, Phillips, metallocene, single site and constrained geometry catalysts to produce polymers having different combinations of properties. Such polymers may be highly branched or substantially linear and the branching, polydispersity and average molecular weight may vary depending upon the parameters and processes chosen for their manufacture in accordance with the teachings of the polymer arts.

"Polyethylene" is the name for a polymer whose basic structure is characterized by the chain —($CH_2$—$CH_2$—)$_n$. Polyethylene homopolymer is generally described as being a solid which has a partially amorphous phase and partially crystalline phase with a density of between 0.915 to 0.970 g/cm$^3$. The relative crystallinity of polyethylene is known to affect its physical properties. The amorphous phase imparts flexibility and high impact strength while the crystalline phase imparts a high softening temperature and rigidity.

Unsubstituted polyethylene is generally referred to as high density homopolymer and has a crystallinity of 70 to 90 percent with a density between about 0.96 to 0.97 g/cm$^3$. Most commercially utilized polyethylenes are not unsubstituted homopolymer but instead have $C_2$-$C_8$ alkyl groups attached to the basic chain. These substituted polyethylenes are also known as branched chain polyethylenes. Also, commercially available polyethylenes frequently include other substituent groups produced by copolymerization. Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

People skilled in the art generally refer to several broad categories of polymers and copolymers as "polyethylene." Placement of a particular polymer into one of these categories of "polyethylene" is frequently based upon the density of the "polyethylene" and often by additional reference to the process by which it was made since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 g/cm$^3$ and (b) copolymers of ethylene and an alpha-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chains have some branching, are "ultra high molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

Another broad grouping of polyethylene is "high pressure, low density polyethylene" (LDPE). LDPE is used to denominate branched homopolymers having densities between 0.915 and 0.930 g/cm$^3$. LDPEs typically contain long branches off the main chain (often termed "backbone") with alkyl substituents of 2 to 8 or more carbon atoms.

Linear Low Density Polyethylene (LLDPE) are copolymers of ethylene with alpha-olefins having densities from 0.915 to 0.940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range, and metallocene and other types of catalysts are also employed to produce other well known variations of LLDPEs).

Ethylene α-olefin copolymers are copolymers having an ethylene as a major component copolymerized with one or more alpha olefins such as octene-1, hexene-1, or butene-1 as a minor component. EAOs include polymers known as LLDPE, VLDPE, ULDPE, and plastomers and may be made using a variety of processes and catalysts including metallocene, single-site and constrained geometry catalysts as well as Ziegler-Natta and Phillips catalysts.

Very Low Density Polyethylene (VLDPE) which is also called "Ultra Low Density Polyethylene" (ULDPE) comprises copolymers of ethylene with alpha-olefins, usually 1-butene, 1-hexene or 1-octene and is recognized by those skilled in the art as having a high degree of linearity of structure with short branching rather than the long side branches characteristic of LDPE. However, VLDPEs have lower densities than LLDPEs. The densities of VLDPEs are recognized by those skilled in the art to range between 0.860 and 0.915 g/cm$^3$. A process for making VLDPEs is described in European Patent Document publication number 120,503 whose text and drawing are hereby incorporated by reference into the present document. Sometimes VLDPEs having a density less than 0.900 g/cm$^3$ are referred to as "plastomers".

Polyethylenes may be used alone, in blends and/or with copolymers in both monolayer and multilayer films for packaging applications for such food products as poultry, fresh red meat and processed meat.

As used herein, the term "modified" refers to a chemical derivative e.g. one having any form of anhydride functionality, such as anhydride of maleic acid, crotonic acid, citraconic acid, itaconic acid, fumaric acid, etc., whether grafted onto a polymer, copolymerized with a polymer, or otherwise functionally associated with one or more polymers, and is also inclusive of derivatives of such functionalities, such as acids, esters, and metal salts derived therefrom. Another example of a common modification is acrylate modified polyolefins.

As used herein, terms identifying polymers, such as e.g. "polyamide" or "polypropylene," are inclusive of not only polymers comprising repeating units derived from monomers known to polymerize to form a polymer of the named type, but are also inclusive of comonomers, as well as both unmodified and modified polymers made by e.g. derivitization of a polymer after its polymerization to add functional groups or moieties along the polymeric chain. Furthermore, terms identifying polymers are also inclusive of "blends" of such polymers. Thus, the terms "polyamide polymer" and "nylon polymer" may refer to a polyamide-containing homopolymer, a polyamide-containing copolymer or mixtures thereof.

The term "polyamide" means a high molecular weight polymer having amide linkages (—CONH—)$_n$ which occur along the molecular chain, and includes "nylon" resins which are well known polymers having a multitude of uses including utility as packaging films, bags, and casings. See, e.g. *Modern Plastics Encyclopedia,* 88 Vol. 64, No. 10A, pp 34-37 and 554-555 (McGraw-Hill, Inc., 1987) which is hereby incorporated by reference. Polyamides are preferably selected from nylon compounds approved for use in producing articles intended for use in processing, handling, and packaging food.

The term "nylon" as used herein it refers more specifically to synthetic polyamides, either aliphatic or aromatic, either in crystalline, semi-crystalline, or amorphous form characterized by the presence of the amide group —CONH. It is intended to refer to both polyamides and co-polyamides.

Thus the terms "polyamide" or "nylon" encompass both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Preferably, polymers are selected from compositions approved as safe for producing articles intended for use in processing, handling and packaging of food, such as nylon resins approved by the U.S. Food and Drug Administration provided at 21 CFR §177.1500 ("Nylon resins"), which is incorporated herein by reference. Examples of these nylon polymeric resins for use in food packaging and processing include: nylon 66, nylon 610, nylon 66/610, nylon 6/66, nylon 11, nylon 6, nylon 66T, nylon 612, nylon 12, nylon 6/12, nylon 6/69, nylon 46, nylon 6-3-T, nylon MXD-6, nylon MXDI, nylon 12T and nylon 6I/6T disclosed at 21 CFR §177.1500. Examples of such polyamides include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polylauryllactam) and copolymers or mixtures thereof.

In use of the term "amorphous nylon copolymer," the term "amorphous" as used herein denotes an absence of a regular three-dimensional arrangement of molecules or subunits of molecules extending over distances which are large relative to atomic dimensions. However, regularity of structure may exist on a local scale. See, "Amorphous Polymers," Encyclopedia of Polymer Science and Engineering, 2nd Ed., pp. 789-842 (J. Wiley & Sons, Inc. 1985). In particular, the term "amorphous nylon copolymer" refers to a material recognized by one skilled in the art of differential scanning calorimetry (DSC) as having no measurable melting point (less than 0.5 cal/g) or no heat of fusion as measured by DSC using ASTM 3417-83. The amorphous nylon copolymer may be manufactured by the condensation of hexamethylenediamine, terephthalic acid, and isophthalic acid according to known processes. Amorphous nylons also include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, "EVOH" refers to ethylene vinyl alcohol copolymer. EVOH is otherwise known as saponified or hydrolyzed ethylene vinyl acetate copolymer, and refers to a vinyl alcohol copolymer having an ethylene comonomer. EVOH is prepared by the hydrolysis (or saponification) of an ethylene-vinyl acetate copolymer. The degree of hydrolysis is preferably from about 50 to 100 mole percent, more preferably, from about 85 to 100 mole percent, and most preferably at least 97%. It is well known that to be a highly effective oxygen barrier, the hydrolysis-saponification must be nearly complete, i.e. to the extent of at least 97%. EVOH is commercially available in resin form with various percentages of ethylene and there is a direct relationship between ethylene content and melting point. For example, EVOH having a melting point of about 175° C. or lower is characteristic of EVOH materials having an ethylene content of about 38 mole % or higher. EVOH having an ethylene content of 38 mole % has a melting point of about 175° C. With increasing ethylene content the melting point is lowered. Also, EVOH polymers having increasing mole percentages of ethylene have greater gas permeabilities. A melting point of about 158° C. corresponds to an ethylene content of 48 mole %. EVOH copolymers having lower or higher ethylene contents may also be employed. It is expected that processability and orientation would be facilitated at higher contents; however, gas permeabilities, particularly with respect to oxygen, may become undesirably high for certain packaging applications which are sensitive to microbial growth in the presence of oxygen. Conversely, lower contents may have lower gas permeabilities, but processability and orientation may be more difficult.

As used herein, the term "polyester" refers to synthetic homopolymers and copolymers having ester linkages between monomer units which may be formed by condensation polymerization methods. Polymers of this type are preferable aromatic polyesters and more preferable, homopolymers and copolymers of poly(ethylene terephthalate), poly (ethylene isophthalate), poly(butylene terephthalate), poly (ethylene naphthalate) and blends thereof. Suitable aromatic polyesters may have an intrinsic viscosity between 0.60 to 1.0, preferably between 0.60 to 0.80.

Turning now to a first aspect of the invention, a method is provided for introducing an additive into a polymer melt. The additive may be a liquid, especially a viscous liquid, but is preferably a solid at room temperature (~23° C.). The liquid is a liquid at room temperature and may be any suitable liquid which is selected depending upon the choice of a variety of parameters including e.g. additive solubility and/or dispersibility, safety, cost, available equipment for processing, compatibility with the carrier polymer, intended uses, etc. Suitable liquids may include polar or nonpolar solvents. Non-oil based and substantially oil free (especially mineral oil free) liquid compositions are preferred. Water, alcohols or mixtures thereof are preferred as solvents or liquids. Water is especially preferred. Solutions are preferred over dispersions and emulsions. Aqueous solutions of a dissolved additive solute are especially preferred. It is further contemplated that "liquid" may include addition of additive and solid water i.e.

ice under conditions which may create in situ an additive containing aqueous solution, dispersion or emulsion.

Thus, a liquid comprising an additive e.g. an additive solute of e.g. a salt dissolved in water is introduced into a melt of a base polymer. The quality of the mixing, and functionality of the resulting blend, may depend upon the physical and chemical properties of the additive and the base polymer as well as process parameters such as the type and configuration of mixing equipment. It is desirable to achieve good mixing of the liquid and the polymer melt for uniform dispersion of the additive within the melt.

A schematic of one embodiment of a process is shown in FIG. 1. An extruder 10 is provided. The extruder is fed a polymer from a polymer source 12. The polymer is generally provided in pellet form. The extruder is also fed a liquid 14 comprising water and an additive. The location of the liquid injection may vary and will be described in more detail below. From the extruder 10, the molten polymer including the additive is fed to a die 16, where it is pelletized. The pellets provide a masterbatch 18 of the base polymer blended with the additive. The masterbatch 18 may then be added to more of the base polymer in a mixer 20 and fed into a second extruder 22. The second extruder may then be used to form a film 24.

Turning now to the extrusion process, aspects of an extrusion process are well known in the art. In extrusion, plastic pellets or granules are plasticized, homogenized, and continuously or intermittently formed into articles. The extrusion process can be combined with a variety of operations some of which may be applied after extrusion as known in the art. Such operations include film or sheet forming, tubular film forming, orientation, blow molding, thermoforming, injection molding, rotational molding, compression molding, foaming, uniaxial or biaxial stretching, calendaring, machining, and punching. A variety of types of extruders can be used, including single screw, twin screw, and multiscrew extruders. The extruder typically includes the following elements: a feed hopper into which plastic pellets are charged; a barrel, which contains the screw; one or more screws, which plasticates, heats, fluidizes, homogenizes, and/or transports the plastic to the die; a screen pack and breaker plates for filtration of the polymer melt and providing back pressure; and a die for establishing the extrusion profile.

Figure 2:
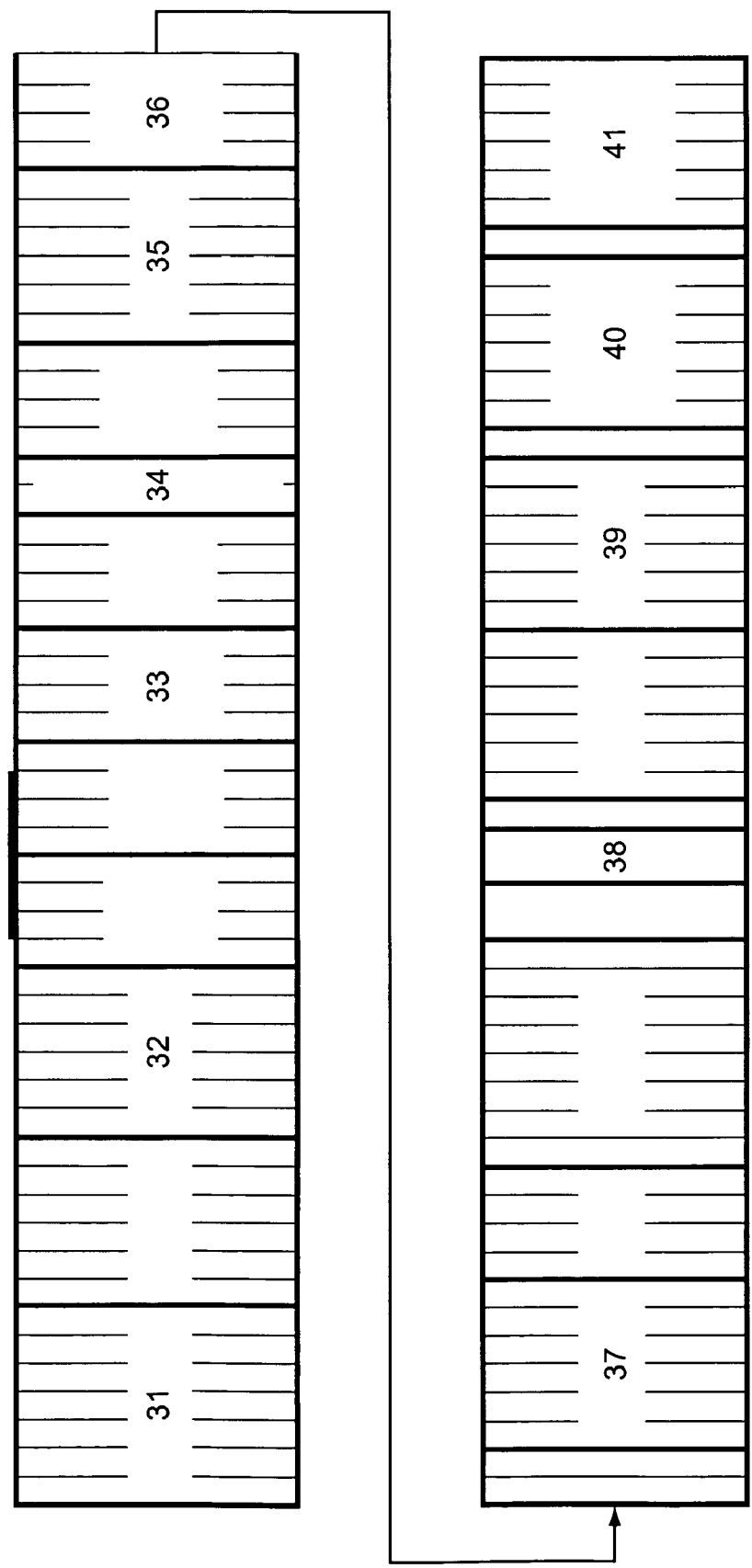
FIG. 2 is a representation of the zones of an extruder.

A particular embodiment of an extruder that may be used in the process is shown in FIG. 2. The extruder is a twin screw extruder. It is divided into a variety of zones 31-41. The base polymer is fed into the feed zone 31. The base polymer may be fed through a feed port in feed zone 31. Heating and melting of the polymer occurs in zone 32. Paddles are provided in zone 33 for intensifying the mixing. A restriction device such as a full bore orifice plug is provided in zone 34. The restriction device fills most of the area of the barrel and the polymer melt is forced around the restriction device. This restriction causes the mixing sections upstream of the restriction to completely fill with the polymer or polymer/additive blend. The restriction also tends to increase the residence time of the material in the mixing zone and consequently improve melting, additive dispersion and other qualities that benefit from mixing. Other restriction devices besides the full bore orifice plug may be used, depending on the type of extruder. A high free volume or reduced pressure area is provided in zone 35. The liquid, which includes preferably water and the additive, is injected in zone 36. The liquid may be injected through an injection port, which is located at a position downstream of the base polymer feed port. The polymer/additive combination moves into an intensive mixing zone 37 where further dispersion of the additive into the base polymer occurs. An additional restriction device or plug is provided in zone 38. The polymer melt is above the boiling point of the liquid (the following description will refer to water as the liquid, however it will be understood that other liquids may also be used in like manner), therefore portions of the liquid e.g. water begin to vaporize after the injection. This vaporized water exits the extruder through a vent in zone 39. The vent may be located at any suitable position downstream from the liquid injection port e.g. in a section having a high free volume or reduced pressure to avoid solids exiting through the vent (hereinafter termed "vent creep"). The vent may be open to the environment or it may be connected to a pumping device such as a vacuum pump. The vapor may also vent at other locations in the extruder, such as the inlet port in zone 31. Further mixing occurs at zone 40, and the melt exits the extruder at zone 41. In general, at least two restriction devices such as full bore orifice plugs may be provided e.g. one downstream of the additive solution feed port and one upstream of the solution feed port to create an area of confinement for liquid water. However, it is possible to run the process without a restriction device such as a plug.

It has been found that the temperature of the polymer melt may have the following effect on the processing; if the temperature is too high, the lower viscosity of the melt may promote vent creep which can force material out of the vent. This vent creep may be exacerbated by the presence of processing additives within the base polymer. It has been found that heating the base polymer to a temperature just above the melting point of the base polymer minimizes the amount of vent creep due to the addition of the solution. For polyethylene, the polymer may be heated to a temperature of above about 275° F. (135° C.), preferably to about 330° F. (166° C.). For various materials, the polymer is preferably heated to a temperature of less than 100° F. above the melting point of the polymer.

The process depicted in FIG. 2 has several beneficial aspects. Because the additive is preferably introduced into an already molten carrier polymer, the residence time at high temperature and high shear is reduced. However, the additive may also be introduced before the polymer is melted. The evaporating water also removes some of the energy from the system, further reducing the exposure temperature of the additive. This is an advantage for the generation of masterbatches containing thermally sensitive materials. By providing for the addition of a material as a solution or suspension, the present method allows for the creation of low average particle size, narrow distributions of materials in polymers. In instances where the dispersed material is unavailable as a fine particle size powder, this technique may be used to create high quality dispersions. Dispersions or emulsions utilizing the inventive method may beneficially have a desirable uniformity of distribution of the additive throughout the base polymer which in turn may be used to provide polymeric articles incorporating the highly uniform additive containing masterbatch to produce highly uniform polymeric articles or article components such as a layer in a multilayer thermoplastic film having a highly uniform distribution of additive. Advantageously, solutions according to the present invention which have an additive solute dissolved in a solvent such as water may have the above uniformity of distribution benefit coupled with an additional benefit of uniformity of particle size of the additive. It is believed that as the heat of the polymer melt drives off the solvent as vapor from the well mixed solubilized additive containing liquid and polymer combination, that the additive forms small uniform particles. This uniformity of particle size delivers a corresponding uniformity of functionality across the polymer when coupled with the uniformity of distribution which also results from the inventive process. In dispersed solid in liquid dispersion embodiments of the invention, the particle size is more dependent upon the ingoing particle size since the particles themselves are already solid rather than being formed in situ upon vaporization. Nonetheless the process of the invention also provides an advantageous uniform distribution of dispersed particles even if the average particle size remains relatively unchanged in a dispersion embodiment compared to a solution embodiment.

A variety of additives can be added to a base polymer in this manner. The high temperature and shearing conditions may tend to degrade some materials, so that may limit the types of materials that may be used as an additive. As noted above, the additive may be either dissolved or suspended in a liquid such as water. Thus, possible additives include soluble additives and especially water soluble additives such as salts, as well as water suspensions such as colloids, foams, emulsions, dispersions and sols. A variety of different types of materials may be added in order to produce a polymer with certain desired properties. In one embodiment, the additive may be a colorant, opacifier, flavorant, perfume, anti-microbial, fungicide, antioxidant, protein, enzyme, antiblocking agent, antistatic agent, antifog agent, slip agent, light stabilizer, light absorber, process aid, release agent, a reactive indicator compound, or taggants e.g. rare earth elements or marker compositions. The additive may be an element or a compound and either a single material or a blend of materials.

In one embodiment, the additive is a salt with a cation and an anion. The cation may be selected from the following group: ammonium, lithium, sodium, potassium, rubidium, cesium, beryllium, magnesium, calcium, barium, strontium, aluminum, iron II, iron III, cobalt, nickel, copper I, copper II, zinc, silver, and tin. The anion may be selected from the following group: halide (e.g., fluoride, chloride, bromide, iodide, astatide), oxide, sulfide, phosphate, hydrogen phosphate, dihydrogen phosphate, pyrophosphate, polyphosphate, sulfate, hydrogen sulfate, pyrosulfate, sulfite, hydrogen sulfite, pyrosulfite, thiosulfite, thiosulfate, carbonate, hydrogen carbonate, tetraborate, metaborate, nitrate, nitrite, hydroxide, and silicate. The additive may also include soluble polymers, acids, or organic acids (such as propionic acid, formic acid, acetic acid, benzoic acid, and sorbic acid) or the salts of those acids. Inorganic salts such as alkali metal nitrites and nitrates are preferred additives e.g. for delivery of myoglobin blooming agents to a meat surface via a polymeric food package in vacuum package or to provide binding agents to reactive sites to affect other functionalities in nonfood applications such as surface oxidation prevention.

In one embodiment, the polymer blend including the additive preferably includes less than 1% (by weight of the polymer) of benzodiazole, benzotriazole, amine benzoates, amine molybdates, amine nitrates, sodium benzoate, or sodium molybdate.

In a particular embodiment, the additive is a myoglobin blooming agent such as an NO donating compound. This is particularly useful for meat packaging. It is desirable for meat to have the red or "bloomed" meat color that consumers use as their primary criterion for perceiving freshness. NO donating compounds, such as sodium nitrite or sodium nitrate, provided on the surface of an interior layer of packaging affect the color of vacuum packaged meat. In particular, when sodium nitrite is coated onto the inner contact film surface of a vacuum package, the meat may turn brown after evacuating oxygen. After a period of time, the preferred red color gradually displaces the brown color and remains stable in a vacuum package for several months. See e.g. WO 2005/097486 (Siegel) published on Oct. 20, 2005 and Pockat et al U.S. patent application entitled, "Myoglobin Blooming Agent Containing Shrink Films, Packages and Methods for Packaging" filed Apr. 28, 2006, Ser. No. 11/413,504, both of which whose teachings are hereby incorporated by reference in their entireties.

Turning now to packaging, packaging can consist of a variety of layers including monolayer polymeric structures such as films or trays as well as multilayer structures such as films, trays or other articles of 2, 3, 4, 5, 6, 7, 8, 9, or more layers. In one embodiment, multilayer packaging films are provided that comprise a first layer and a second layer positioned in any suitable configuration. The first layer is preferably a heat-resistant layer and the second layer is preferably a sealant layer.

Examples of various preferred multilayer configurations include the following:
    Abuse Resistant (Exterior)/Barrier/Sealant (Interior);
    Abuse Resistant (Exterior)/Core/Barrier/Core/Sealant (Interior);
    Abuse Resistant (Exterior)/Adhesive/Core/Barrier/Core/Sealant (Interior);
    Abuse Resistant (Exterior)/Adhesive/Core/Barrier/Core/Adhesive/Sealant (Interior);
    Abuse Resistant (Exterior)/Adhesive/Barrier/Adhesive/Sealant (Interior);
    Abuse Resistant (Exterior)/Nylon Core/Barrier/Core/Sealant (Interior);
    Abuse Resistant (Exterior)/Adhesive/Core/Barrier/Nylon Core/Sealant (Interior); and
    Abuse Resistant (Exterior)/Adhesive/Core/Barrier/Nylon Core/Adhesive/Sealant (Interior)

A brief description of each layer follows.

Abuse-Resistant Outer Layer

In one aspect, the multilayer film can include an abuse resistant layer (which may also be a heat resistant layer) that can include a polyolefin such as polyethylene or polypropylene, ionomer, polyester, nylons such as semi-crystalline or amorphous nylon or blends thereof e.g. a blend of an amorphous nylon copolymer, a low temperature polyamide and/or a high temperature polyamide. A heat resistant layer can be positioned at or near the exterior surface of the packaging film.

Barrier Layers

The multilayer packaging films can further include a barrier layer, which is preferably a gas barrier layer. The gas barrier layer is preferably an oxygen barrier layer, and is preferably a core layer positioned between the exterior and interior layers. The barrier layer can comprise any suitable material, such as EVOH, PVDC, polyacrylonitrile, nylon, nanocomposite or a metal foil such as aluminum.

For perishable food packaging, the oxygen ($O_2$) permeability desirably should be minimized: Typical oxygen barrier films will have an $O_2$ permeability of less than about 310 $cm^3/m^2$ for a 24 hour period at 1 atmosphere, 0% relative humidity and 23° C., and preferably less than 75 $cm^3/m^2$, more preferably less than 20 $cm^3/m^2$. Barrier resins such as PVDC or EVOH in the core layer may be adjusted by blending in compatible polymers to vary gas permeability e.g. $O_2$ of the films.

Tie Layers

In addition to the first layer and the second layer, a multilayer packaging film can further include one or more adhesive layers, also known in the art as "tie layers," which can be selected to promote the adherence of adjacent layers to one another in a multilayer film. The adhesive layer is preferably formulated to aid in the adherence of one layer to another layer by virtue of the compatibility of the materials in that layer to the first and second layers. Peelable tie layers may also be utilized for provision of easy opening features for manual opening of a package.

Sealant/Food Contact Layer

The multilayer film can also include a sealant layer, or for food packaging a food contact layer, that is preferably positioned at or near the interior surface of the packaging film. In one preferred embodiment of the invention, the additive of the present invention may be provided in the sealant or interior layer to provide functionality to products contained within a package. The sealant layer can comprise a suitable heat-sealable polymer such as an ethylene-α-olefin copolymer or ionomer. The sealant layer is preferably formulated and positioned to form a heat seal. Hermetically sealed packages may be made utilizing masterbatches made according to the present invention.

A sealant layer preferably comprises a heat sealable polymeric material such as polyolefins including polypropylene homopolymers, polypropylene copolymers, very low density polyethylene (VLDPE), ultra low density polyethylene (ULDPE), linear low density polyethylene (LLDPE) or homogeneous polyolefin resins, such as made with single-site catalysts (SSC) e.g. metallocene or constrained geometry catalysts. Ethylene vinyl acetate (EVA) copolymers are also suitable materials for forming the inner surface heat sealable layer. A sealant layer may also comprise an ionomer such as Surlyn®, available from DuPont Company. This material is essentially a metal salt neutralized copolymer of ethylene and an organic acid or acids like acrylic or methacrylic acid. Sealant layer can be 5 to 50% of the thickness of the total structure with a preferred thickness being about 15% of the total thickness. Preferred examples of such sealable resins constituting a sealant layer may include: SSC-LLDPE, SSC-VLDPE, LLDPE, VLDPE, ULDPE, EVA, EMAA, EAA, EMA, and ionomer resins. Examples of suitable resins include those sold by Dow Chemical Company under the trade names of "AFFINITY," "ATTANE" and "ELITE" and those available from ExxonMobil Co. under the trade name of "EXACT" and "ESCORENE."

Film Thickness

Preferably, the film has a total thickness of less than about 10 mils, more preferably the film has a total thickness of from about 1 to 10 mils, still more preferably from about 1 to 5 mils, and yet still more preferably, from about 1.5 to 3 mils. For example, entire single or multilayer films or any single layer of a multilayer film can have any suitable thicknesses, including 1, 2, 3, 4, 5, 6, 7, 8, 9, or 10 mils, or any increment of 0.1 or 0.01 mil therebetween.

At least one layer of packaging preferably includes an additive. The additive may be a salt and for certain preferred embodiments is preferably an NO donating compound. The NO donating compound provides nitric oxide gas as a result of the reduction of the nitrite (or other NO donating compound) on the package after contact with certain products such as meat and this gas affects the color development of the meat food product under reduced oxygen conditions. The NO donating compound is preferably incorporated within the interior layer. The NO donating compound is preferably evenly dispersed throughout the entire layer to enable any length of film incorporating the layer to include approximately similar amounts of the compound within the sealing layer for a uniform effect on a food product. The NO donating compound is preferably present not only in a uniform distribution, but also with uniformly small particle sizes i.e. a small particle size range of small particles.

In one embodiment, the NO donating compound may be selected from inorganic or organic nitrates, inorganic or organic nitrites, nitrosodisulfonates such as Fremy's salt, organic nitro compounds, O-nitrosylated compounds, S-nitrosylated compounds, N-nitrosylated compounds, nonoate compounds, transition metal/nitroso complexes, furoxans, sydnonimines, and oximes. The NO donating compound may be a salt, particularly an inorganic salt, more particular a nitrite or nitrate salt. Sodium nitrate or sodium nitrite may typically be used. Potassium nitrate or potassium nitrite may also be used.

In another embodiment additives may comprise other types of myoglobin blooming agents such as nitrogen heterocycles e.g. niacin, and nicotinamide.

The base polymer can be any suitable polymer, and is typically a polyolefin. For example, the base polymer may be a polyethylene, e.g. very low density polyethylene (VLDPE), linear low density polyethylene (LLDPE), or low density polyethylene (LDPE). The base polymer may also be polypropylene, ethylene vinyl acetate, EMAA, and mixtures thereof. Particular examples include Dow ATTANE® 4201-G VLDPE, Dow 608A LDPE, Dow AFFINITY, ExxonMobil ESCORENE, and Voridian 74556 LLDPE.

Therefore, for a water soluble material, it has been found that providing the additive as an aqueous solution provides a more uniform and consistent particle size and a more uniform distribution and dispersion of the compound within the polymer. The additive may be a salt or an NO donating compound. An aqueous solution is prepared from the additive. The concentration of the additive is preferably close to the saturation concentration of the aqueous solution. For sodium nitrite, the solution preferably includes between about 20 wt % and about 42 wt % of the additive. The aqueous solution including the additive and water is introduced into a polymer melt. This is typically performed in an extruder to attempt to uniformly disperse the additive within the base polymer. The base polymer is preferably at a temperature above a melting point of the base polymer so as to form a polymer melt. It has been found that heating the base polymer to a temperature just above the melting point of the base polymer minimizes the amount of vent creep due to the addition of the solution. For polyethylene, the polymer may be heated to a temperature of above about 275° F. (135° C.), preferably about 330° F. (166° C.). The additive containing liquid is mixed with the polymer melt in the extruder to form a blend. At least a portion of the liquid (typically water) vaporizes and vents from the extruder. Suitably at least 10 wt %, preferably at least 50 wt. %, more preferably at least 90 wt. %, and most preferably at least 98% of the liquid, preferably water, is removed from the base polymer and additive containing liquid blend prior to extrusion e.g. by vaporization of the water and venting with or without a vacuum assist. The liquid reduced (thermally dewatered) blend is then extruded from the extruder. The blend is then typically extruded into pellets, but may be extruded directly as a film. The opening through which a polymer melt extrudate normally exits the extruder and to which a die is normally attached is referred to herein as a die regardless of whether a separate die is attached to the extrudate exit orifice or opening.

The NO donating compound or other additive may be added to the same extruder used to form a polymeric structure such as a flexible thermoplastic film. More commonly, the additive is first mixed with base polymer to form a masterbatch of pelletized blends. Pellets from the masterbatch are convenient for subsequent use in fabricating articles. Thus, after dispersion of an additive such as an NO donating compound with a carrier polymer in a mixing device is complete, the polymer melt is discharged through a shaping device or die that is used to prepare pellets of the masterbatch. To form the convenient pellet shape, the die typically is outfitted with circular orifices through which the molten compound flows, exiting the die and being solidified by cooling. The circular orifices form continuous cylinders or strands of the compound that are subsequently cooled and cut to form thermoplastic pellets. Pellets from the masterbatch may then be mixed with additional base polymer or another polymer, heated to a plastic state and formed into a desired shape e.g. a film by any of the well known film forming processes. When used to create a masterbatch, a sufficient amount of the solution is introduced into the polymer melt to obtain a blend that includes up to 10 wt. % or more of additive. For certain embodiments additive salts such as nitrite may beneficially be made having between about 2 wt % and about 10 wt % additive, preferably between about 4 wt % and about 6 wt % additive. It will be recognized in view of the present teachings that the upper limit may vary depending upon selection of various parameters including additive and liquid composition and properties such as solubility as well as equipment configuration and capacities. The lower limit is that deemed practical for the intended use.

Exemplary of a suitable use for the invention, as previously described, the pellets from the masterbatch may be added to pellets of the base polymer (and/or one or more different polymers) and then formed into an article, such as a tray, film or sheet. For example, to produce an article suitable for use in delivery of a myoglobin blooming agent to a meat surface in a package a sufficient amount of a solution may be introduced into a polymer melt to obtain a polymer sheet including between about 0.05 wt % and about 5 wt % salt, preferably between about 0.1 wt % and about 2.5 wt % salt. The blended polymer sheet may then be incorporated into a package for a food product, particularly a meat product. The blended polymer sheet typically forms an inner layer of the package. The package may be used with any type of meat, including but not limited to beef, pork, lamb, poultry, and fish. The desired concentration of NO donating compound may depend on the type of meat being packaged, the amount of available myoglobin, desired depth of penetration of agent into the meat surface, subsequent film formation operations such as stretching which affect e.g. the surface area of the film, and other factors.

Without intending to be bound by theory, it is believed that nitric oxide gas forms as a result of the reduction of the nitrite (or other NO donating compound) on the package and this gas affects the color of the meat food product. The nitric oxide gas is believed to have a similar effect on bloom as oxygen or carbon monoxide gas. The "bloom time" for the red color to fully develop depends on the oxygen exposure as well as the freshness of the muscle and the specific cut. A visually perceptible "well done" indication of cooking for the food product is hard to achieve when the nitric oxide gas penetrates intact muscle or ground meat to depths that almost reach the center of the individual portion. Therefore, it is desirable to control the level of additive utilized to achieve a very shallow penetration by the color effect (believed to be caused by nitric oxide penetration) of the viewing surface of the food product. As the depth of the nitric oxide gas penetration increases, the internal color is less affected by cooking temperatures that normally turn the color brown or grey. When this happens, a condition known as "pink ring" or "persistent pinking" may occur. See, McGee, "Meat," *On Food and Cooking*. Rev. Ed., 2004, Chapter 3, pp. 118-178, at p. 149 (Scribner, New York, N.Y.) which chapter is hereby incorporated by reference in its entirety. It is not possible to cook the product to the normal appearance of a well-done level. The packaging preferably provides between 0.01 to 10 μmoles, more preferably between 0.02 to 2 μmoles, of the blooming agent per square inch to the uncooked meat product surface within 96 hours after contact.

Turning now to the formation of the packaging film, a monolayer or multilayer film may be made by conventional processes including e.g. slot cast or blown film processes. It may also be made by a thermoforming or by an orientation process, e.g. under conditions to produce a film which is heat shrinkable at 90° C. or less. Descriptions of suitable orientation processes are disclosed in U.S. Pat. No. 5,759,648 to Idlas, which is hereby incorporated by reference in its entirety.

The multilayer films and food packages may be manufactured by coextrusion of all layers simultaneously, for example, as described in published U.S. Pat. Application No. 2004/0166262 to Busche et al., entitled "Easy open heat-shrinkable packaging," and incorporated herein by reference in its entirety. Busche et al. also describes easy opening peelable packaging. Other manufacturing methods are well known and disclosed e.g. in U.S. Pat. No. 4,448,792 (Schirmer), or U.S. Pat. No. 3,741,253 (Brax et al.), which discloses a coating lamination procedure to form a relatively thick primary multilayer extrudate either as a flat sheet or, preferably, as a tube which may be subsequently formed into a film.

As generally recognized in the art, resin properties may be further modified by blending two or more resins together and it is contemplated that various resins may be blended into individual layers of the multilayer film or added as additional layers, such resins include ethylene-unsaturated ester copolymer resins, especially vinyl ester copolymers such as EVAs, or other ester polymers, very low density polyethylene (VLDPE), linear low density polyethylene (LLDPE), low density polyethylene (LDPE), high density polyethylene (HDPE), nylons, ionomers, polypropylenes, polyesters, or any polymer listed in this application or any document referenced herein or blends thereof. These resins and others may be mixed by well known methods using commercially available tumblers, mixers or blenders. Also, if desired, well known additives such as processing aids, slip agents, antiblocking agents, pigments, etc., and mixtures thereof may be incorporated into the film.

Various polymer modifiers may be incorporated for the purpose of improving or achieving particular properties for a desired application including for example toughness, orientability, and/or extensibility of the film or to affect optical properties such as gloss, transparency, haze, puncture resistance, abuse resistance, heat sealability, flexibility, etc. Other modifiers which may be added include: modifiers which improve low temperature toughness or impact strength, and modifiers which reduce modulus or stiffness. Exemplary modifiers include: styrene-butadiene, styrene-isoprene, and ethylene-propylene copolymers.

All percentages reported herein are by weight unless otherwise indicated.

EXAMPLES

Example 1

A 40% solids sodium nitrite solution was prepared by dissolving 8 kg of Repauno Products $NaNO_2$ (between 99.5%-99.7% pure and including about 0.05% sodium carbonate and 0.2% sodium nitrate) (obtained from Hydrite Chemical Company, Brookfield, Wis.) in 12 kg of water. The solution was made with tap water at room temperature by gently agitating the water/nitrite mixture.

Dow ATTANE® 4201-G VLDPE (obtained from Dow Chemical Company, Midland, Mich.) was loaded into the hopper of a gravimetric dosing unit that was positioned to feed the polymer into the main feed port of an APV Extrusion Systems MP 2050 50 mm corotating twin screw extruder. The feeder was configured to dose the ATTANE at a rate of 41 kg/h. The mixing elements of the twin screw extruder were arranged in a fashion that allowed for feeding and melting of the VLDPE, injection and mixing of the water/nitrite solution, removal of the water, pressurization of a die and formation of continuous strands of a homogeneous VLDPE/nitrite blend.

The twin screw extruder was electrically heated so that the feed zone was at about 200° F. and the rest of the extruder at about 330° F. When the extruder zones achieved the intended temperatures, the drive motor was engaged to rotate the extruder screws at about 578 RPM. The ATTANE VLDPE was dosed into the primary feed port at about 41 kg/h. Once a stable, homogeneous extrudate was achieved, the nitrite/water mixture was injected into the molten VLDPE at an injection port. A gear pump was used to deliver the nitrite/water solution to the injection port. The injection point was placed in a section of the extruder configured to have high free volume and low pressure. The rate of delivery of the solution was calculated by the time change in mass of the water/nitrite mixture. To achieve the intended concentration of 5%, the pump speed was set at 33 RPM. Then, the water/nitrite delivery rate was found to be about 5.4 kg/h and the nitrite concentration, upon accounting for the removal of the water, was 5%.

The mixing elements of the extruder were arranged in a fashion such that the liquid water/nitrite solution was prevented from moving upstream to the primary feed port. Full bore orifice plugs were used to prevent the unwanted upstream migration.

Following injection, the nitrite water solution rapidly increased in temperature. The water fraction of the solution evaporated and eventually boiled. The resultant steam escaped through an atmospheric pressure vent port. It was noted that some steam also escaped through the primary feed port. Following this mixing section, the VLDPE/salt blend moved into a pressurization section and finally, into an eight hole strand die. Upon exiting the die, the resultant continuous strands were cooled in a water bath. At the exit of the water bath, an air knife removed some of the moisture clinging to the surface of the stands. After leaving the influence of the air knife, the strands where cut into discrete pellets by a rotating knife-style pelletizer. Those pellets were subsequently dried in a convection oven at about 50° C. (to remove the remainder of the surface moisture contributed by the water bath), packed in aluminum foil containing bags and stored for use.

Examples 2-5

Dow AFFINITY PL 1850 polyolefin plastomer (density=0.902 g/cm$^3$; melt index=3 dg/min) was dry blended with the masterbatch pellets produced in Example 1 by tumble mixing to yield net sodium nitrite contents of 0.1%, 0.2%, 0.5%, and 1.0% by weight. Films were prepared from the plastomer/masterbatch pellet blends using a laboratory-scale cast film extrusion line. The extruded films were about 8 inches wide and 2.25 mils thick and exhibited excellent gloss and transparency. Each film was laminated to an oxygen barrier layer-containing film of the following composition: PETG/tie/nylon 6/EVOH/nylon 6/tie/VLDPE. The PETG was a copolymer of terephthalic acid, ethylene glycol and cyclohexane dimethanol. EVOH provided a high barrier to oxygen. The sodium nitrite-containing cast films were joined to the VLDPE surface of the oxygen barrier film via thermal lamination where heat and pressure was used to fuse the adjacent layers. The laminated films were fabricated into open pouches such that the nitrite-containing cast films formed the innermost layer of the pouch. Fresh cut beef samples were inserted into the pouches, the headspace oxygen was substantially removed and the packages were closed with a heat seal. During refrigerated storage, the color of the packaged beef was observed over a period of time. After 72 hours, the beef exhibited the results shown in Table 1 below.

TABLE 1

|  | Sodium nitrite level | Blooming |
|---|---|---|
| Example 2 | 0.1% | poor to none |
| Example 3 | 0.2% | poor to none |
| Example 4 | 0.5% | some bloom |
| Example 5 | 1.0% | excellent bloom |

It can be seen from the results in Table 1, that at levels as low as 0.5% sodium nitrite, the packaging provided a suitable bloom to the beef. The bloomed color remained stable at least 30 days beyond the time of packaging. It is believed that meat products having lower amounts of myoglobin such as pork, or poultry may show desirable bloom at lower levels of additive than that required for beef.

Comparative Example 6

A masterbatch was made as described in Example 1 except as indicated below. A masterbatch of 10% sodium nitrite in low density polyethylene was produced by simultaneously adding sodium nitrite powder (not in solution) and LDPE pellets to the feed section of the same corotating twin screw extruder used in Example 1. The LDPE was melted and the powder was dispersed via the mixing capability of the extruder. The die and cutting device described in Example 1 was used to produce pellets. Those pellets were subsequently fabricated into thin films at levels of 0, 1000, 5000, 10000 and 25000 ppm by dilution into ExxonMobil EXACT 3139 polyolefin plastomer (density=0.900 g/cm$^3$; melt index=7.5 dg/min) on the same laboratory scale extrusion equipment used in Example 1. Unlike the films produced in Examples 2-5, the films produced by the comparative method were rough while exhibiting visually evident specks of sodium nitrite particles. These specks were considered undesirable as a consumer of a packaged product may regard them as contaminants like dirt. Although the resultant films contained large particles, red color development and fixation in accordance with nitrite concentration was observed when fresh meat was sufficiently contacted by the films using the method described in Example 1. However, the initial color development was not homogeneous as large sodium nitrite particles tended to generate blotches of intense color though the intensity of the blotches tended to diminish with time.

Although the present invention has been described with reference to preferred embodiments, those skilled in the art will recognize that changes may be made and formed in detail without departing from the spirit and scope of the invention. It is therefore intended that the foregoing detailed description be regarded as illustrative rather than limiting, and that it be understood that it is the following claims, including all equivalents, that are intended to define the scope of this invention.

What is claimed is:

1. A method of producing packaging for meat comprising:
introducing a first polymer into an extruder;
introducing a masterbatch of an additive containing polymer into the extruder to form a polymer blend; wherein the additive is an NO donating compound;
wherein the masterbatch is made by
a) heating a base polymer to a temperature above a melting point of the base polymer to form a polymer melt;
b) introducing into the polymer melt a solution comprising a salt and water;
c) mixing the solution with the polymer melt in the extruder to form a blend;
d) allowing at least a portion of the water to vaporize and to vent from the extruder; and
e) extruding the blend to form the masterbatch; and
forming a packaging film from the masterbatch containing blend; and
fabricating the film into a package, wherein the film forms an inner layer of the package.

2. The process of claim 1, wherein the base polymer is selected from the group consisting of polyolefin, polyethylene, polypropylene, ethylene vinyl acetate, EEA, EMA, EMAA, polybutene-1, and mixtures thereof.

3. The process of claim 1, wherein the salt is selected from the group consisting of nitrite salts, nitrate salts, and mixtures thereof.

4. The process of claim 1, wherein the salt is selected from the group consisting of sodium nitrite, sodium nitrate, and mixtures thereof.

5. The process of claim 1, wherein a sufficient amount of the solution is introduced into the polymer melt to obtain a film comprising between about 0.05 wt% and about 5 wt% salt.

6. The process of claim 1, wherein a sufficient amount of the solution is introduced into the polymer melt to obtain a film comprising between about 0.1 wt% and about 2.5 wt% salt.

* * * * *